United States Patent [19]

Alm

[11] Patent Number: 4,561,972
[45] Date of Patent: Dec. 31, 1985

[54] COMBINE SIEVE PLATE

[75] Inventor: Arthur L. Alm, Griswold, Iowa

[73] Assignee: Murry W. Schuler, Griswold, Iowa ; a part interest

[21] Appl. No.: 677,857

[22] Filed: Dec. 4, 1984

[51] Int. Cl.$^4$ ............................ B07B 1/00; B07B 4/08
[52] U.S. Cl. ...................................... 209/254; 209/26; 209/267; 209/281; 209/352; 209/392; 209/318; 130/24
[58] Field of Search ............................. 130/24, 25, 26; 209/281, 282, 274, 26, 27, 254, 267, 400, 402, 386, 388, 276, 277, 416, 352, 392, 420, 421, 312, 318, 28

[56] References Cited

U.S. PATENT DOCUMENTS

| | | | |
|---|---|---|---|
| 434,249 | 8/1890 | Closz | 209/26 |
| 547,189 | 11/1895 | Stafford | 130/25 |
| 731,895 | 6/1903 | Hancock | 209/275 X |
| 749,531 | 1/1904 | Conner | 130/25 |
| 1,013,257 | 1/1912 | Wylie | 130/25 |
| 1,016,424 | 2/1912 | Loveland | 209/281 |
| 1,501,455 | 7/1924 | Ingersoll | 130/26 |
| 2,739,597 | 3/1956 | Buttars | 209/274 X |
| 2,923,409 | 2/1960 | Yonash | 209/274 X |
| 3,043,427 | 7/1962 | Eisert | 209/26 |
| 4,480,643 | 11/1984 | Alm | 130/27 X |

Primary Examiner—Frank W. Lutter
Assistant Examiner—Thomas M. Lithgow
Attorney, Agent, or Firm—Zarley, McKee, Thomte, Voorhees & Sease

[57] ABSTRACT

A grain harvesting combine is provided with an improved sieve plate for more efficient cleaning of the grain. The sieve plate is mounted on the combine adjacent the rearward end thereof and is substantially rectangular in shape. The sieve plate has forward and rearward edges and opposite side edges, the forward edge and side edges being substantially coplanar. The sieve plate also has a forward portion which slopes downwardly from the forward edge and terminates in a substantially flat portion extending rearwardly to the rearward edge. Inclined opposite side portions are also provided which slope downwardly from each side edge to the flat portion of the sieve. The degree of incline of the forward portion and side portions is approximately 5° from the flat portion. The inclined side portions minimized grain loss when the combine is operating on sloping terrain.

8 Claims, 6 Drawing Figures

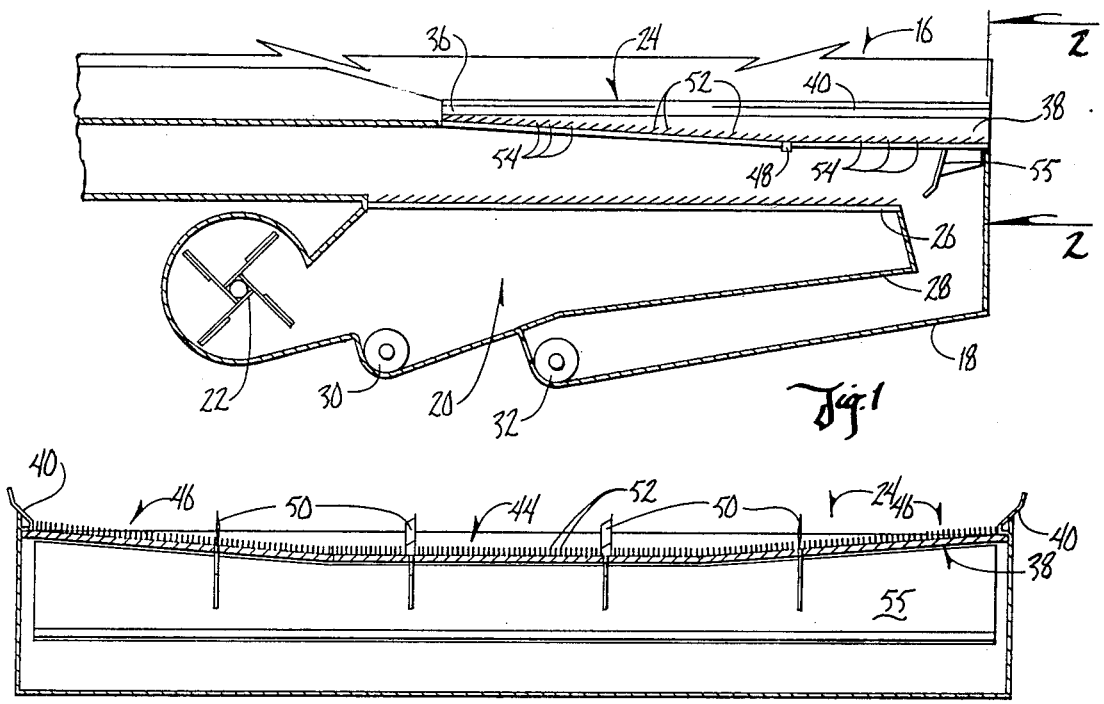
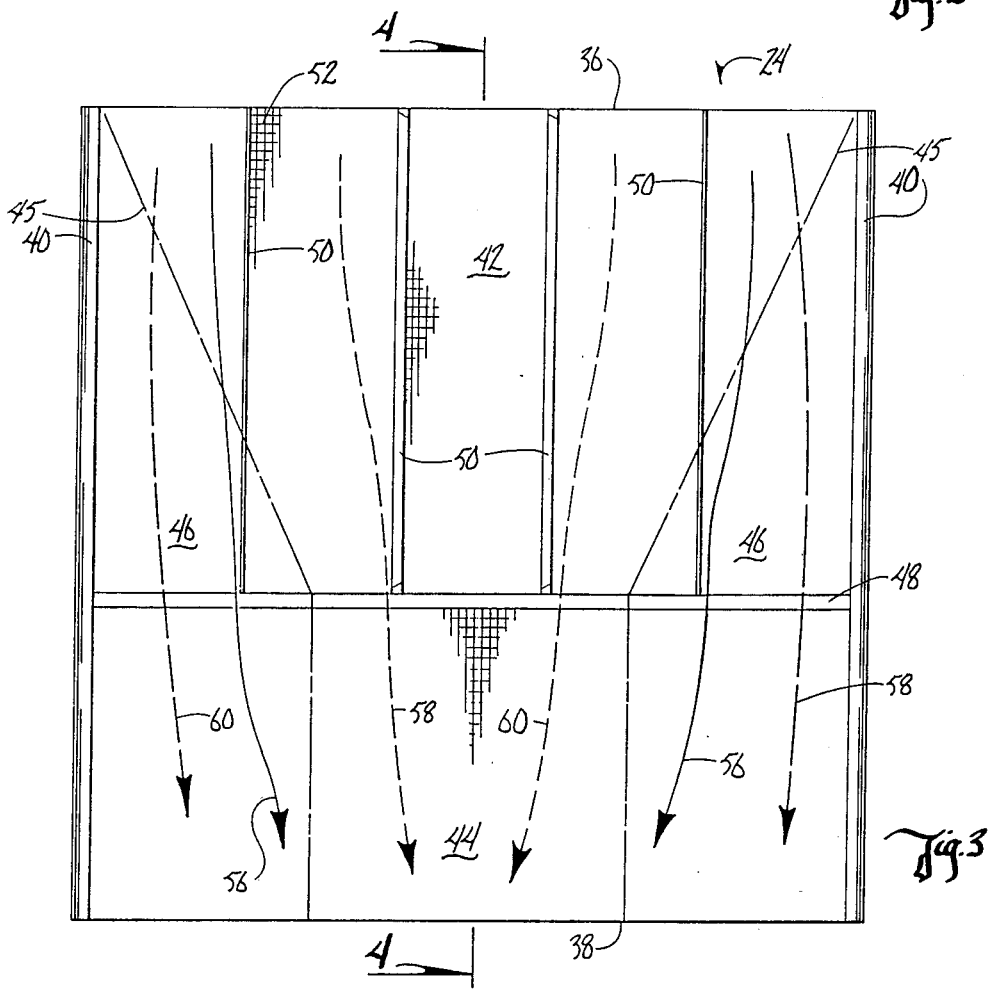

COMBINE SIEVE PLATE

BACKGROUND OF THE INVENTION

Conventional modern combines usually have a pair of substantially flat, perforated sieve plates. The harvested grain is deposited on the upper sieve plate, and a fan directs air upwardly and rearwardly through this plate to blow away the chaff and foreign material and to permit the clean grain to fall through the perforations of the plate. Normally, a second sieve plate is located below and in spaced relation to the first sieve plate where the same action is repeated.

A problem associated with the flat sieve plates is that when the combine operates on a lateral incline, the sieve plates are also inclined such that grain moves to one lateral side thereof and spills therefrom. Also, the conventional sieve plates must be cleaned regularly during operation of the combine, and as frequently as every two hours.

Therefore, a primary objective of the present invention is the provision of an improved sieve plate which reduces grain loss during operation of the combine on uneven terrain.

Another objective of the present invention is the provision of a sieve plate which requires less frequent cleaning than conventional sieve plates.

A further objective of the present invention is the provision of a sieve plate which permits the combine to be operated at increased speeds during harvesting.

A still further objective of the present invention is the provision of a sieve plate for grain combines which is economical to manufacture, and durable and efficient in use.

A still further object of the invention is to provide a seive plate that will provide a substantially horizontal cleaning portion even when the combine is laterally inclined.

These and other objectives will be apparent to those skilled in the art.

SUMMARY OF THE INVENTION

The sieve plate of the present invention is mounted to the body of the combine adjacent the rearward end thereof. The sieve plate is substantially rectangular in shape and has forward and rearward edges and opposite side edges. The forward edge and side edges lie in a flat plane. The sieve plate further includes a forward portion which slopes downwardly from the forward edge and terminates in a substantially flat portion extending to the rearward edge of the sieve plate. The forward portion tapers inwardly from the forward edge to the flat portion. Inclined opposite side portions are also provided and slope downwardly from each of the side edges of the sieve to the flat portion thereof. The pitch of the forward portion and side portions with respect to the flat portion is approximately 5°.

This concave or funnel-like construction of a sieve plate having angularly disposed side portions and front portion permits the grain to follow an elongated path from the forward edge to the rearward edge of the sieve, as compared to the path followed by the grain on conventional flat sieves. Such increased distance permits more efficient cleaning of the sieve during operation of the combine. Also, the angular construction of the sieve permits a portion thereof to always remain in a horizontal plane even while the combine operates on an inclined surface such that spillage of grain from the sieve is minimized. Increased operational speeds of the combine are also possible by the utilization of the sieve of the present invention.

BRIEF DESCRIPTION OF THE DRAWINGS

FIG. 1 is a partial sectional view of the lower rearward portion of a combine showing the sieve of the present invention.

FIG. 2 is a sectional end view of the sieve plate taken along lines 2—2 of FIG. 1.

FIG. 3 is an enlarged scale top plan view of the sieve plate of the present invention.

DETAILED DESCRIPTION OF THE INVENTION

Figure 5:
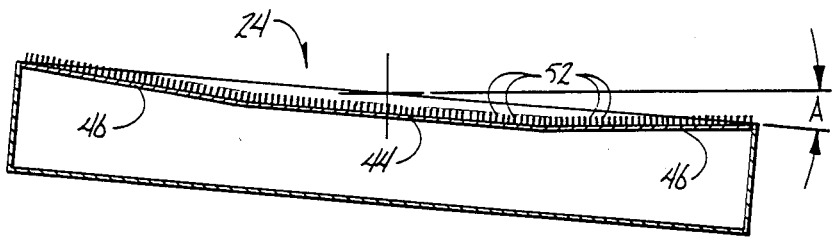
FIGS. 5 and 6 are views showing the relative position of the sieve plate during operation of the combine on inclined surfaces.

The lower rearward end of a combine is shown in FIG. 1 and is generally designated by the reference numeral 16. Rearward end 16 includes a bottom portion 18 and a cleaning compartment 20. Cleaning compartment 20 houses a fan 22, an upper sieve plate 24, a lower sieve plate 26, and a clean grain plate 28, as best shown in FIG. 1. Combine rearward end 16 also includes a conventional clean grain auger 30 for conveying the clean grain out of the combine and a return auger 32 which returns unclean grain back through cleaning compartment 20 for further cleaning.

With the exception of upper sieve plate 24, the above described structure is conventional for most modern combines, and does not, per se, comprise the present invention. The novelty of the present invention resides in the construction of sieve plate 24.

Unlike conventional sieve plates which are flat, plate 24 includes portions residing in a plurality of different planes. Plate 24 includes a forward edge 36, a rearward edge 38, and opposite side edges 40. Forward edge 36 and side edges 40 are substantially coplanar.

Figure 4:
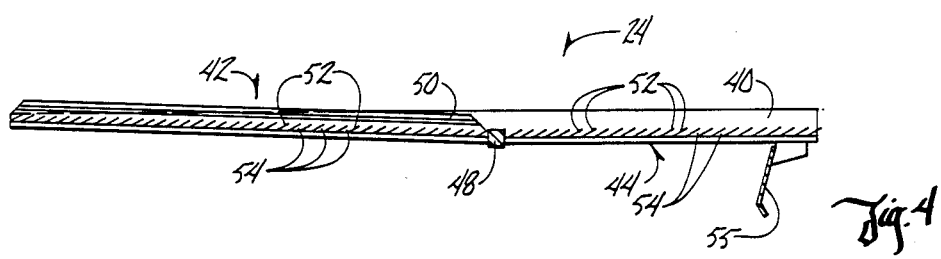
FIG. 4 is a sectional view of the sieve plate taken along lines 4—4 of FIG. 3.

Sieve 24 further includes a forward portion 42 which slopes downwardly from forward edge 36 and terminates in a substantially flat portion 44 extending rearwardly from the approximate midpoint of sieve plate 24 to rearward edge 38 thereof. As seen in FIG. 3, forward portion 42 is tapered inwardly from forward edge 36 to flat portion 44 as indicated by bent lines 45. Inclined side portions 46 are provided which slope downwardly from side edges 40 to flat portion 44. Side portions 46 become progressively wider from forward edge 36 to flat portion 44, in conjunction with the taper of forward portion 42. As seen in FIGS. 2 and 4, forward portion 42 and side portions 46 are inclined preferably approximately 5° with respect to flat portion 44. Flat portion 44 preferably constitutes approximately 42% of the width of sieve plate 24.

Sieve plate 24 also includes a first frame member 48 extending between opposite side edges 40 and a plurality of spaced apart second frame members 50 extending from forward edge 36 to first frame member 48. Additional frame members similar to second frame members 50 may extend from first frame member 48 to rearward edge 38 of sieve 24. A plurality of spaced apart fingers 52 extend between side edges 40 and are pivotally supported by second frame members 50 such that the angle of inclination of fingers 52 is adjustable, as in conventional sieve plates. Fingers 52 facilitate the separation of the chaff and foreign material from the grain. The construction of fingers 52 define a plurality of apertures 54 therebetween, which permit air from fan 22 to be forced upwardly therethrough, so as to blow away chaff and foreign material. Apertures 54 also permit clean grain to fall through upper sieve plate 24 to lower sieve plate 26, wherein further cleaning takes place. A wind baffle 55 may also be attached to the rearward end of sieve plate 24 to direct air upwardly through apertures 54.

Figure 6:
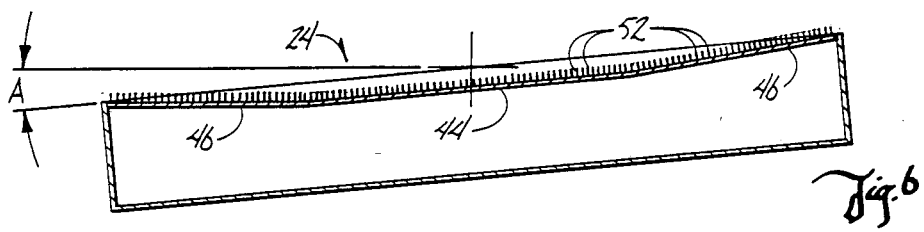

As depicted in FIGS. 5 and 6, when the combine operates on an inclined surface, one of side portions 46 remains substantially horizontal such that grain is not spilled from sieve plate 24. In comparison, a conventional flat sieve plate is tilted at the same degree as the combine when the combine is on a slope, thereby spilling grain from the low side of the sieve. Sieve 24 therefore maintains a more uniform layer of grain over its entire width when the combine is on either flat or sloping terrain, thereby enhancing the ability of fan 22 to blow the chaff and foreign material out of sieve 24.

Also, grain entering the forward end of sieve plate 24 tends to follow an elongated path as indicated by the arrows in FIG. 3. More particularly, the solid line arrows 56 represent the path followed by the grain when the combine is on flat terrain. Broken line arrows 58 and 60 represent the path followed by the grain when sieve plate 24 is inclined as shown in FIGS. 5 and 6, respectively. This increased distance the grain travels over sieve plate 24, as compared to conventional sieve plates wherein the grain travels substantially in a straight line from the forward edge to the rearward edge thereof, permits more complete cleaning of the grain. The improved cleaning ability of the combine eliminates the need for frequent cleaning of the sieve plate as required in conventional sieves. The diagonal path of the grain over sieve plate 24 also increases the capacity of the combine.

From the foregoing, it can be seen that improved sieve plate 24 permits more efficient cleaning of the grain with less grain loss than does a onventional sieve plate, thereby permitting increased operational speeds of the combine through the fields. Therefore, it is seen that the present invention accomplishes at least all of the stated objectives.

What is claimed is:
1. A substantially rectangular combine sieve, comprising:
a forward edge, a rearward discharge edge and opposite side edges, said forward edge and said side edges being in a substantially flat plane,
a tapered forward portion sloping downwardly and rearwardly from said forward edge to the substantial center of said sieve,
a substantially flat rearward portion extending from said forward portion to said rearward edge,
opposite side portions sloping downwardly from said side edges to said forward and rearward portions,
said sieve being adapted to receive grain adjacent said forward edge whereafter the downward slope of said forward and side portions and the taper of said forward portion provides a funneling action of said grain toward said rearward portion, said funneling action of said grain ceasing when said grain reaches said rearward portion such that a substantially shallow depth of said grain is maintained from said forward edge to said rearward edge.
2. The sieve of claim 1 further comprising a plurality of frame members extending rearwardly from said forward edge to the substantial center of said sieve and rising above the surface of said forward and side portions to prevent the grain from moving substantially across the width of said sieve.
3. The sieve of claim 1 wherein said side edges and said forward edge are elevated approximately 5° above said flat portion.
4. The sieve of claim 1 wherein said side portions are inclined approximately 5° from said flat portion.
5. The sieve of claim 1 wherein said forward portion is inclined approximately 5° from said flat portion.
6. The sieve of claim 1 further comprising a plurality of spaced apart fingers projecting upardly therefrom to define sieve apertures and to separate the grain from the chaff.
7. The sieve of claim 6 further including means for adjusting the angle of inclination of said fingers.
8. The sieve of claim 6 further including a wind baffle attached adjacent said rearward edge of said sieve for directing said air upwardly through said apertures.

* * * * *